(12) United States Patent
Bilowski (10) Patent No.: US 8,827,774 B2
(45) Date of Patent: Sep. 9, 2014

(54) PORTIONING AND/OR TRANSPORT DEVICE FOR PORTIONING AND/OR TRANSPORTING ELONGATED SAUSAGE OR OTHER FOOD PRODUCTS

(75) Inventor: Jörg Bilowski, Delingsdorf (DE)

(73) Assignee: Vemag Maschinenbau GmbH, Verden/Aller (DE)

(*) Notice: Subject to any disclaimer, the term of this patent is extended or adjusted under 35 U.S.C. 154(b) by 833 days.

(21) Appl. No.: 12/914,324

(22) Filed: Oct. 28, 2010

(65) Prior Publication Data
US 2011/0111679 A1    May 12, 2011

(30) Foreign Application Priority Data
Oct. 30, 2009    (DE) .................... 20 2009 014 671 U (51) Int. Cl.
*A22C 11/00*    (2006.01)

(52) U.S. Cl.
USPC ............................................. 452/35

(58) Field of Classification Search
USPC ............ 452/21–26, 30–32, 35–37, 46–48, 51
See application file for complete search history.

(56) References Cited

U.S. PATENT DOCUMENTS

| | | | | |
|---|---|---|---|---|
| 4,021,885 A | * | 5/1977 | Muller | 452/40 |
| 4,577,370 A | * | 3/1986 | Kollross | 452/22 |
| 5,102,368 A | | 4/1992 | Strasser et al. | |
| 7,972,202 B2 | * | 7/2011 | Le Pabic | 452/49 |

FOREIGN PATENT DOCUMENTS

| | | |
|---|---|---|
| DE | 19728402 A1 | 7/1998 |
| DE | 19952102 A1 | 5/2001 |
| DE | 10013036 A1 | 9/2001 |
| EP | 1430779 A1 | 6/2004 |

* cited by examiner

*Primary Examiner* — Richard Price, Jr.
(74) *Attorney, Agent, or Firm* — Wood, Herron & Evans LLP (57) ABSTRACT

Portioning and/or transport apparatus for portioning and/or transporting sausages. The apparatus includes a conveyor device having at least one conveyor element which is drivable by a drive motor and which can be brought into contact with a sausage for conveying the sausages.

20 Claims, 8 Drawing Sheets

PORTIONING AND/OR TRANSPORT DEVICE FOR PORTIONING AND/OR TRANSPORTING ELONGATED SAUSAGE OR OTHER FOOD PRODUCTS

TECHNICAL FIELD

The invention concerns a portioning and/or transport apparatus for portioning and/or transporting sausages, comprising a conveyor device having at least one conveyor element which is drivable by means of a drive motor and which can be brought into contact with a sausage for conveying the sausages.

BACKGROUND

Apparatuses of the aforementioned kind are frequently used together with a filling machine for introducing sausage meat into tubular cases (natural or artificial skins). A skin filled with sausage meat is subdivided into portioned sausages which, to the extent possible, are of uniform length. For that purpose, a twist-off location can be produced by rotation of a filling tube of the filling machine. Apparatuses and methods are also known in which portioned sausages are closed at their ends by means of clips. A portioning and/or transport apparatus can be disposed downstream of a filling machine to hold the portioned sausages or skin filled with sausage meat and to further transport same. For example, a string of sausages can be fed to a separating or isolating device disposed downstream in the transport direction. The separated sausages can then be further processed or packaged.

DE 100 13 036 A1 and EP 1 430 779 B1 to the present applicant disclose known portioning and/or transport apparatuses for portioning and/or transporting sausages or similar elongate foodstuff products.

Filling machines may have a rotatable filling tube for producing twist-off locations, which assists with the twisting-off process in that the sausage meat-filled case is prevented from also rotating about its longitudinal axis and, thus, individual twist-off locations can be produced by means of the rotatable filling tube. As is known, conveyor devices in the form of belt or chain conveyors are used for that purpose, such conveyor devices have circulating endless belts or chains which come into contact with the filled skin or a sausage and which prevent the sausages from turning during the twisting-off process and further convey them.

During operation, the process is monitored by an operator. The operator generally pays attention to trouble-free operation and reacts when faults occur. For example, an operator pays attention to ensuring that skins to be filled are always in readiness and the twisting-off process and transport of the sausages takes place properly and without disturbance. If the sausage skin splits, the process has to be interrupted and re-started.

In that respect, visual observation plays a particular part, particularly in the region of the portioning and transport apparatus. In that respect, there is a need for improvement.

SUMMARY OF THE INVENTION

An object of the present invention is to provide a portioning and/or transport apparatus for sausages or other elongate foodstuff products, which facilitates observation of the process by an operator.

According to the invention, that object is attained by a portioning and/or transport apparatus of the kind set forth in the opening part of this specification, in that the at least one conveyor element in operation is inclined relative to a vertical V to the side with respect to a conveyor direction.

The inclination of the one or more conveyor elements is therefore in relation to the vertical axis V and to the side in relation to a conveyor or transport direction of the sausages. A lateral inclination is particularly advantageous in a direction towards an operator who is standing laterally beside the transport apparatus and past whom the sausages pass for example from right to left or from left to right, depending on the respective design configuration of the transport apparatus. The lateral inclination of one or in particular a plurality of conveyor elements means that an operator standing at the side beside the apparatus can markedly better visually observe the process. In particular, he can markedly better observe the skin filled with sausage meat or the portioned sausages, during the twisting-off operation and during transport. That is because, in consideration of the lateral inclination according to the invention of the conveyor element or elements, they conceal the sausages markedly less from the perspective of the operator. In that way, the operator can more completely observe the process and perceive any faults in the process and react thereto more quickly. Due to the improved visibility, an operator can also assume a more comfortable body posture, which increases the concentration faculty and counteracts fatigue phenomena. Overall, it is possible to achieve faster and more reliable fault analysis. In addition, there is also an advantage in regard to handling the apparatus. The step of pulling a fresh gathered-together skin onto a filling tube of an adjacent filling machine is also facilitated by virtue of the inclined arrangement. The operator can better observe the pulling-on process and he has a greater free space available for threading in and pulling on the skin, which results in shorter operational interruptions.

In addition, in comparison with a vertical arrangement of the conveyor element or elements as is known from the state of the art, there is the advantage that the filled skin or the sausages are easily urged laterally in a direction towards a conveyor element by virtue of the effect of the force of gravity so that a defined contact condition occurs.

It is particularly preferred if the at least one conveyor element is inclined at an angle of between about 10° and 80°, particularly preferably about 30° or 75°. Those ranges of angle of inclination afford particularly good visibility for the sausages processing procedure.

In accordance with a particularly preferred embodiment, it is provided that the conveyor device may have the form of a belt or chain conveyor with circulating belts or chains which are mounted by means of wheels rotatable about inclined axes. Belt or chain conveyors provide that a sausage or a string of sausages can be particularly uniformly and reliably held and transported. An operator can observe the sausages and the entire process very comprehensively inclinedly from above. It is particularly preferred if the conveyor device has at least two inclinedly arranged oppositely disposed belts or chains, between which the sausages are arranged during portioning or transport.

In a preferred development of the invention, the entire conveyor device may be arranged inclinedly on a frame. That affords a simple and stable structure. The frame can be a conventional machine frame composed substantially of struts and metal plates.

In an alternative embodiment, the conveyor device may be arranged at a carrier device and the entire carrier device is arranged inclined with respect to a vertical. The carrier device can be a plate which can be mounted in variable positions, a frame assembly or the like, which is secured to a frame.

Simple adjustability of the inclination is afforded if the carrier device together with the conveyor elements is adjustable to different angles of inclination and can be fixed in different angles of inclination. Preferably, the carrier device is pivotable about a substantially horizontal pivot axis. Alternatively or additionally, the carrier device preferably has telescopic tubes.

A particularly desirable capability of positioning the entire portioning and/or transport apparatus is afforded if the conveyor device is mounted to a frame displaceable on rollers so that the apparatus can be optimally positioned relative to a filling tube of a filling machine.

An alternative embodiment provides that the conveyor elements are in the form of rollers which are each mounted rotatably about an inclined axis and a plurality of rollers are arranged in mutually juxtaposed relationship in the conveyor direction and the plurality of rollers are arranged in two spaced rows, between which the sausages are arranged during portioning or transport. Thus, it is possible to provide a kind of roller path for conveying sausages or elongate foodstuff products, the guide or drive rollers of which are preferably inclined in a direction towards one side towards the operator so that the operator can observe the process as comfortably and completely as possible.

In an advantageous development, the conveyor device may be additionally mounted axially displaceably in or in opposite relationship to the conveyor direction of the sausages and fixably in a position. In that way, the conveyor elements can additionally be axially oriented relative to a filling machine without having to displace the entire apparatus.

In a further aspect, the invention attains the aforementioned object by an apparatus for producing and processing sausages, which is characterized in that the at least one conveyor element in operation is inclined relative to a vertical to the side with respect to a conveyor direction.

The combination of a filling machine, twisting-off device and a portioning and/or transport apparatus having laterally inclined conveyor elements implements an advantageous overall system for producing and processing sausages. In regard to the advantages achieved, reference is directed to the foregoing description.

BRIEF DESCRIPTION OF THE DRAWINGS

The invention is described hereinafter by means of preferred embodiments by way of example with reference to the drawings in which.

DETAILED DESCRIPTION

Figure 2:
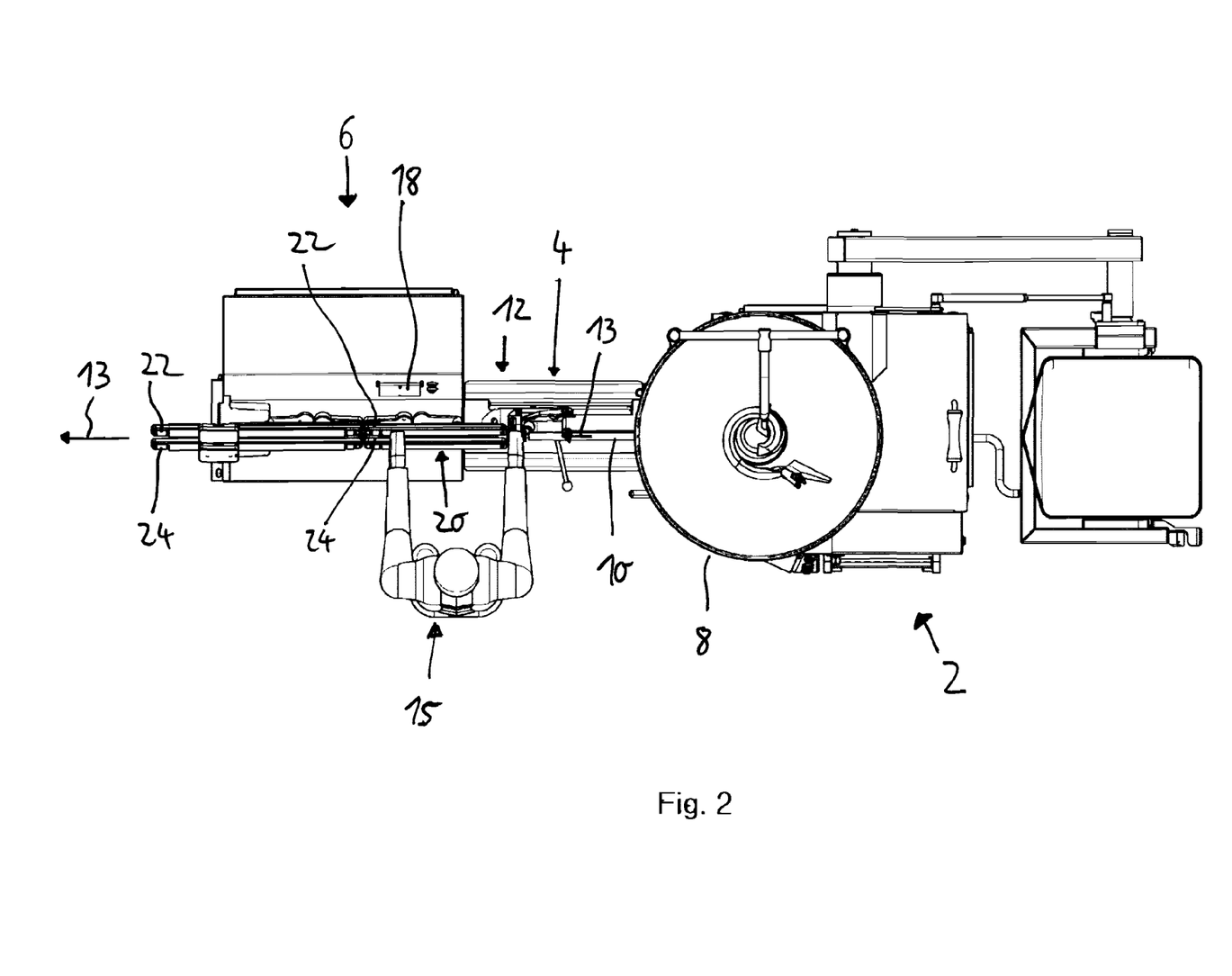
FIG. 2 is a plan view of the apparatus of FIG. 1.
Figure 3:
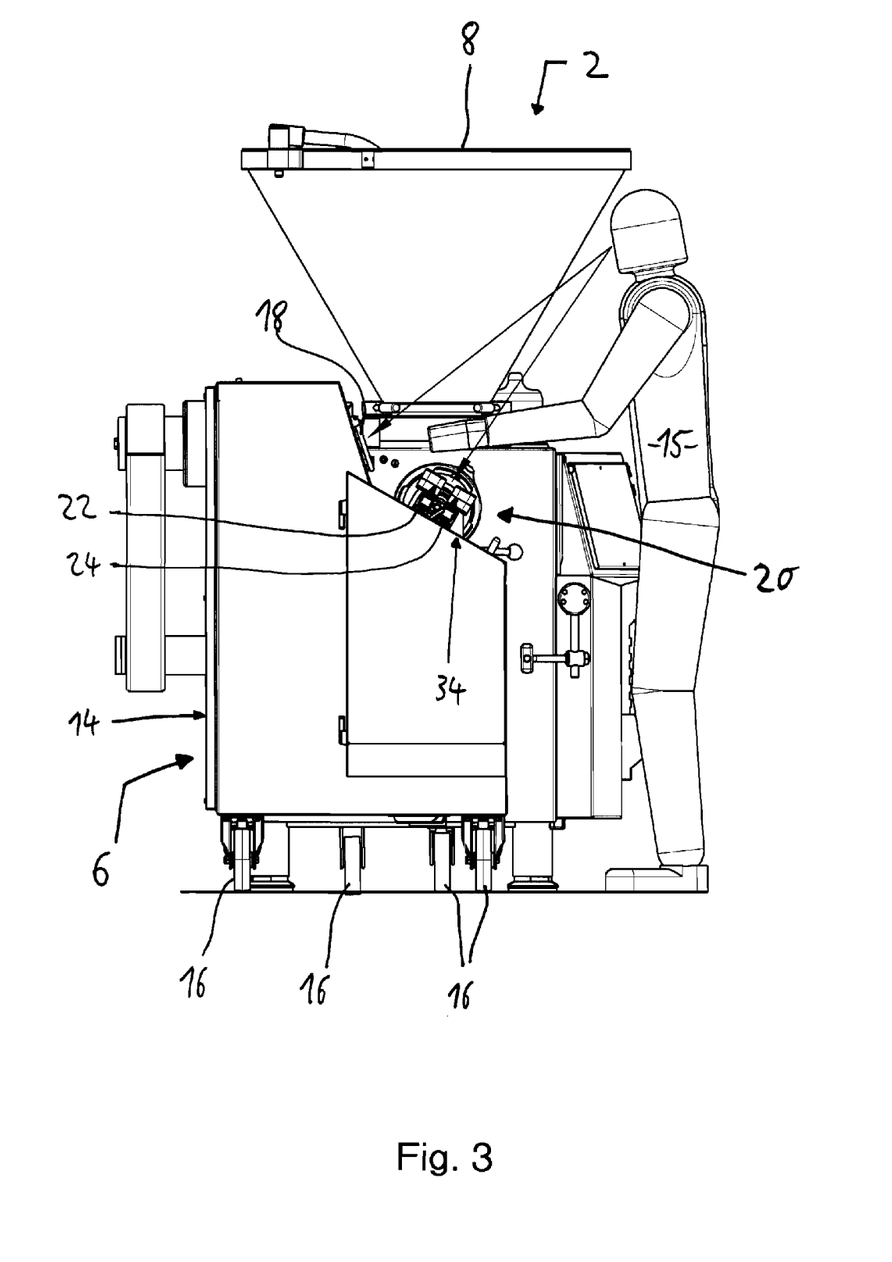
FIG. 3 is an end view of the apparatus of FIG. 1.

The overall apparatus 1 shown in FIG. 2 serves for producing and processing sausages. The apparatus 1 includes a filling machine 2 for introducing sausage meat into a case of natural or artificial skin, a twisting-off device 4 for producing twist-off locations for producing portioned sausages and a portioning and/or transport apparatus 6 for portioning and/or transporting the sausages, which is also referred to hereinafter as the transport apparatus 6. By means of a control arrangement (not shown) which can be part of the filling machine 2 or the transport apparatus 6, all components of the filling machine 2, the twisting-off device 4, and the transport apparatus 6 can be controlled and/or monitored.

Figure 1:
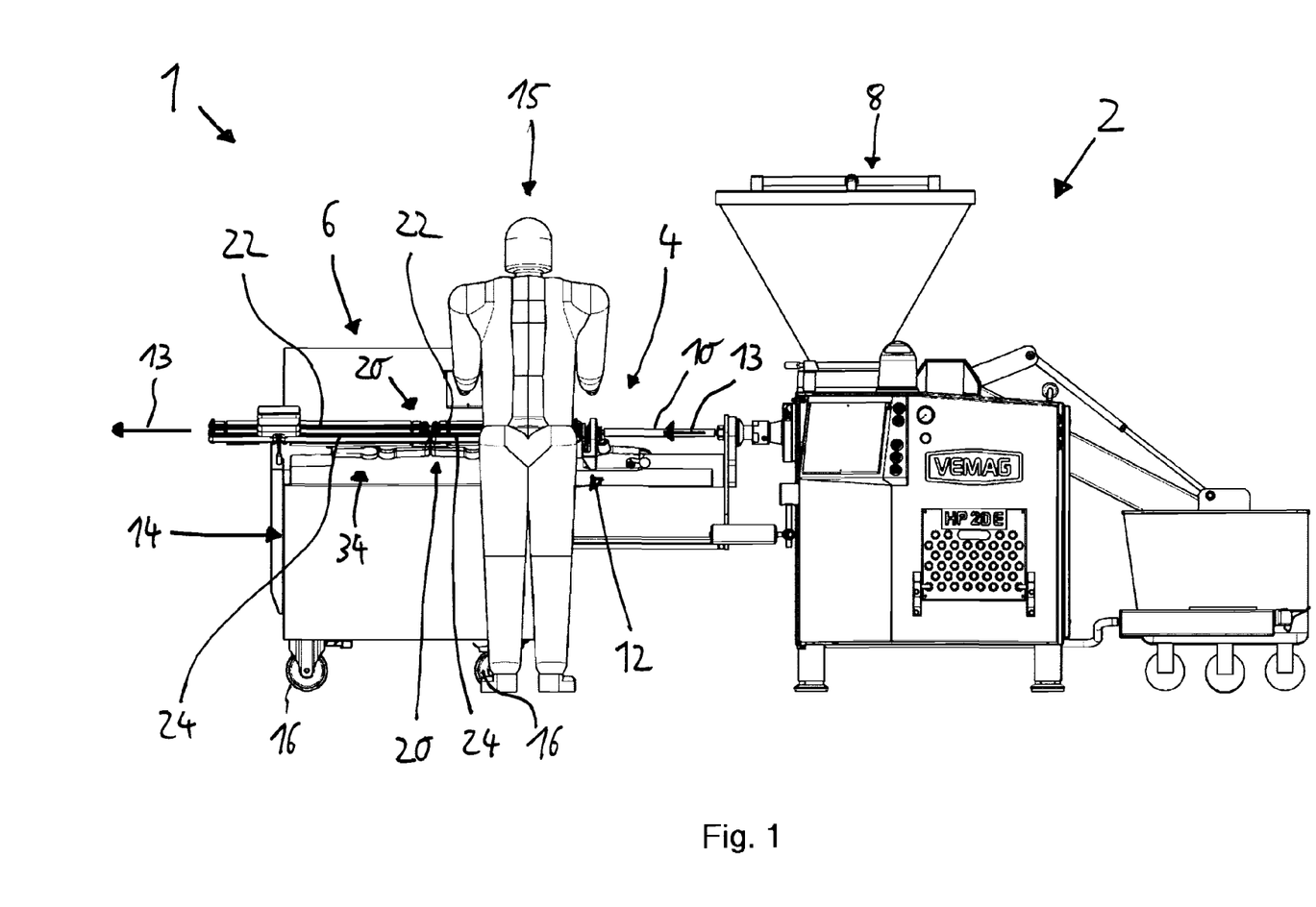
FIG. 1 is a side view of an apparatus for producing and processing sausages comprising a filling machine and a portioning and/or transport apparatuses for sausages.

The filling machine 2 has a hopper 8 for receiving sausage meat, a pump (not shown) communicating with the hopper 14, and a filling tube 10 which can be fed with sausage meat by means of the filling pump and onto which a gathered-together sausage skin can be pulled and through the open end of which (at the left in FIGS. 1 and 2) sausage meat can be introduced into the skin A transitional region 12 adjoins the filling tube 10 downstream in the conveyor direction of the sausage meat and the portioned sausages, indicated by the arrow 13. At the transitional region 12, the filled skin is transferred to the transport apparatus 6 and twist-off locations are formed between portioned sausages by rotation of the filling tube 10 while at the same time the filled sausage is held, in the region of the transport apparatus 6.

The portioning and/or transport apparatus 6 has a frame assembly 14 as well as four rollers 16 which are secured thereto and which can be so arrested that the overall transport apparatus 6 can be fixed after displacement and positioning. As FIG. 4 clearly shows, an operating panel 18 is arranged at the frame assembly 14 so that an operator 15 can operate and control the transport apparatus 6 and possibly further components of the apparatus 1.

A conveyor device 20 is mounted to the frame assembly 14 and serves to hold and convey the filled skin or the portioned sausages. In the illustrated embodiment, the conveyor device 20 is in the form of a belt conveyor having circulating endless belts in the form of toothed belts. Alternatively, the conveyor device 20 could be in the form of a chain conveyor with circulating chains or in the form of a roller conveyor having a plurality of rollers. At any event, the belts, chains, or rollers form conveyor elements for conveying the sausages. The sausages or the sausage meat-filled skin come into contact with those conveyor elements 22, 24. The sausages are transported by the conveyor elements 22, 24 being driven in the conveyor direction (arrow 13).

The conveyor device 20 has a first pair of oppositely disposed belt conveyors (at the right in the FIGS. 1 and 2) which each have a conveyor element 22, 24 in the form of a toothed belt with internal teeth. Optionally, a further pair of oppositely disposed belt conveyors with conveyor elements 22, 24, that is at the left in FIG. 2, is connected at a downstream location to the first pair at the right in FIG. 2 to be able to further transport the sausages in the conveyor direction 13.

Figure 4:
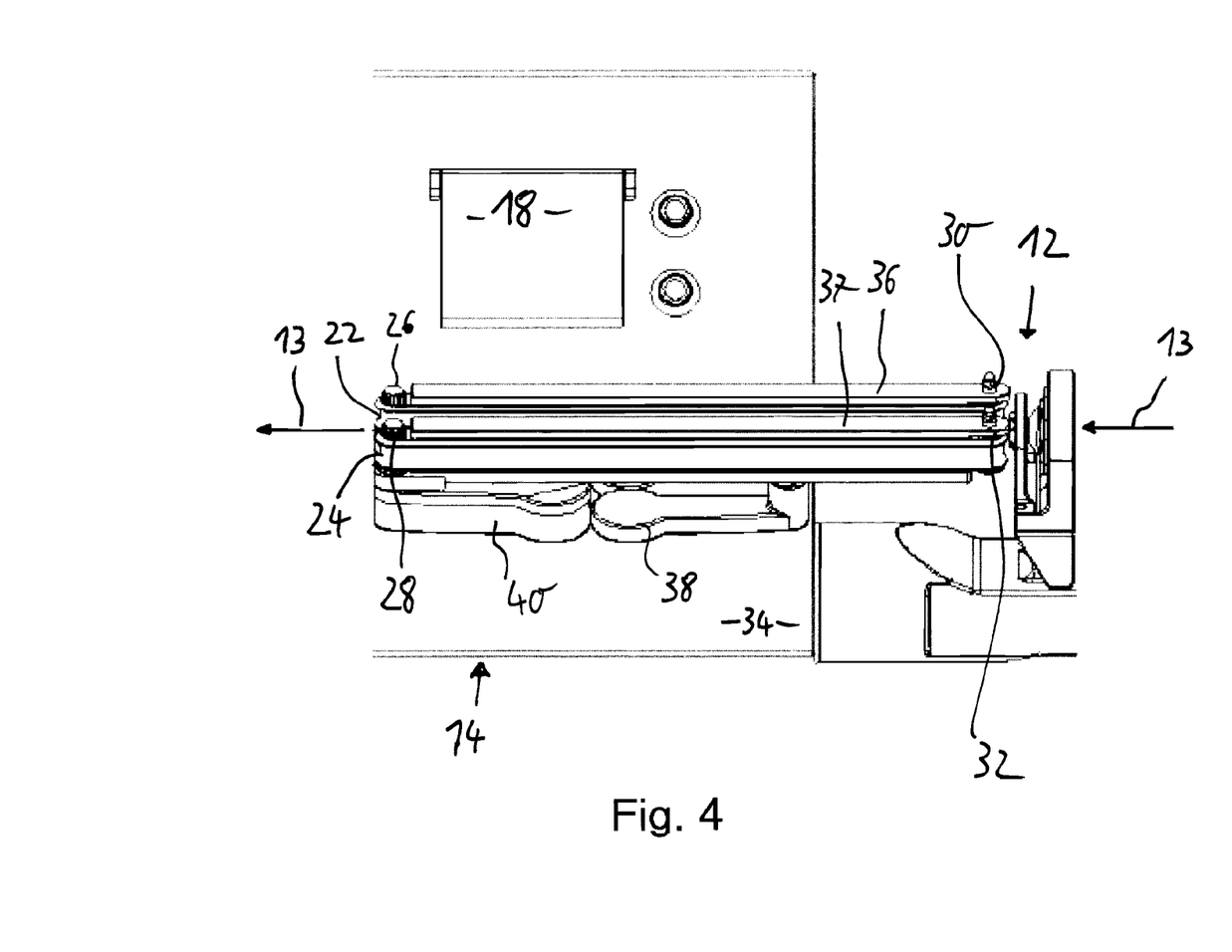
FIG. 4 is a side view of a part of the portioning and/or transport apparatus according to the invention.
Figure 5:
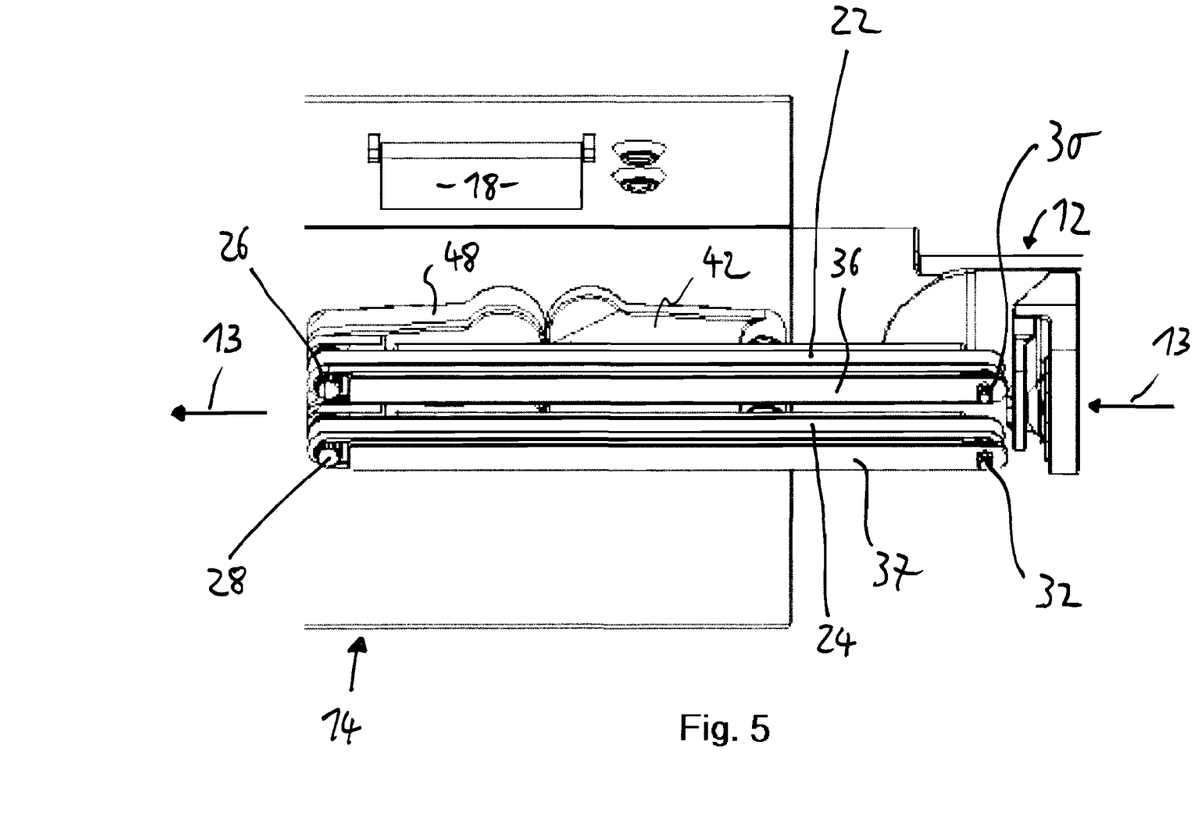
FIG. 5 is a plan view of a part of the portioning and/or transport apparatus according to the invention.
Figure 6:
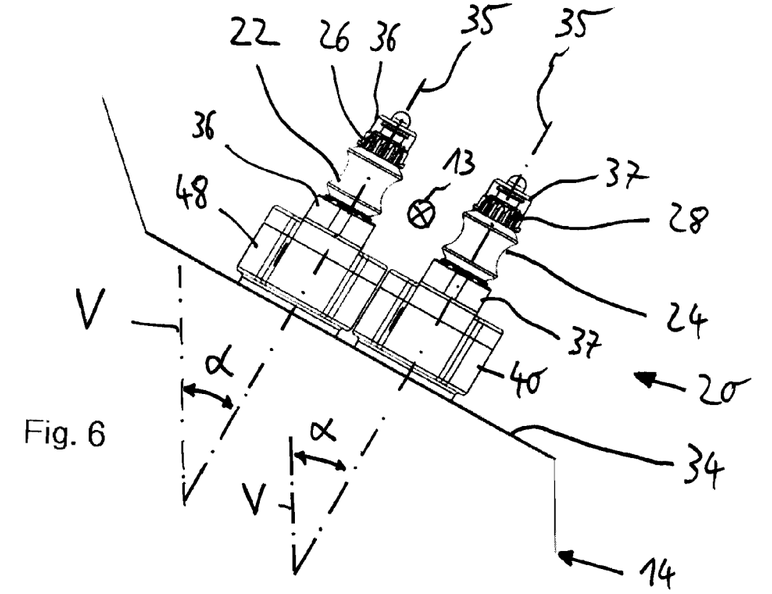
FIG. 6 is a side view on an enlarged scale of the conveyor device of the above-described portioning and/or transport apparatus.

As in particular, FIGS. 4 through 6 show the conveyor elements 22, 24 in the form of toothed belts are drivable by means of a respective gear 26, 28 which is in engagement with the internal teeth of the conveyor element 22, 24. Each gear 26, 28 is mounted on a shaft drivable by means of a drive motor (not shown), preferably an electric motor. Arranged at the ends opposite the gears 26, 28 is a respective directionchanging roller 30, 32 in order to hold the conveyor element 22, 24 in the form of the toothed belt in a tensioned condition and to change its direction.

As shown in FIGS. 1 through 9, the conveyor device 20 and thus the conveyor elements 22, 24 are arranged inclined with respect to a vertical V. The inclination is laterally with respect to the conveyor device 13. In the embodiment of FIGS. 1 through 6, the entire conveyor device 20 is mounted to a plate 34 of the frame assembly 14, that is arranged obliquely and thus inclinedly. The axes of rotation 35 of the rollers 26, 28, 30, 32 are thus inclined at an angle α with respect to a vertical V. In the embodiment, the angle α is between about 10° and 80°, particularly preferably about 30°. In that way, the conveyor elements 22, 24 are also inclined laterally with respect to a vertical V, wherein the inclination is towards a side with respect to the conveyor device 13, that is to say in a direction towards the operator 15. In the embodiment, the inclined arrangement of the conveyor elements 22, 24 or the overall conveyor device 20 makes it possible for the operator 15 to look from an advantageous perspective onto a sausage arranged between the conveyor elements 22, 24 and thus approximately in the direction of the axes 35 (FIG. 6) onto the sausages.

Each belt conveyor has a guide element 36, 37 which is of a double T-shape configuration in cross-section and which is in the form of a rail composed of a plurality of parts in order to guide the conveyor element 22, 24 in the form of a circulating toothed belt in such a way that it does not slip off the gears 26, 28 or the rollers 30, 32 upwardly or downwardly in the direction of the axis 35, nor is it pushed in excessively by virtue of the force applied by the sausages.

As FIG. 4 shows, the conveyor elements 22, 24 which are respectively arranged in mutually oppositely paired relationship can be displaced by means of pivotable arms 38, 40, 42, 44 (FIGS. 4 and 5) in such a way that the spacing of the conveyor elements 22, 24 is variable and can be adapted to different sausage calibers. The guide elements 36, 37 are respectively secured to the arms 38, 42.

In the alternative embodiments described hereinafter, identical parts or parts involving the same function are denoted by the same references as described hereinbefore by means of the previous embodiment and in that respect reference is directed in its full extent to the foregoing description. Hereinafter, it is essentially differences in relation to the previously described embodiment, that are described.

Figure 7:
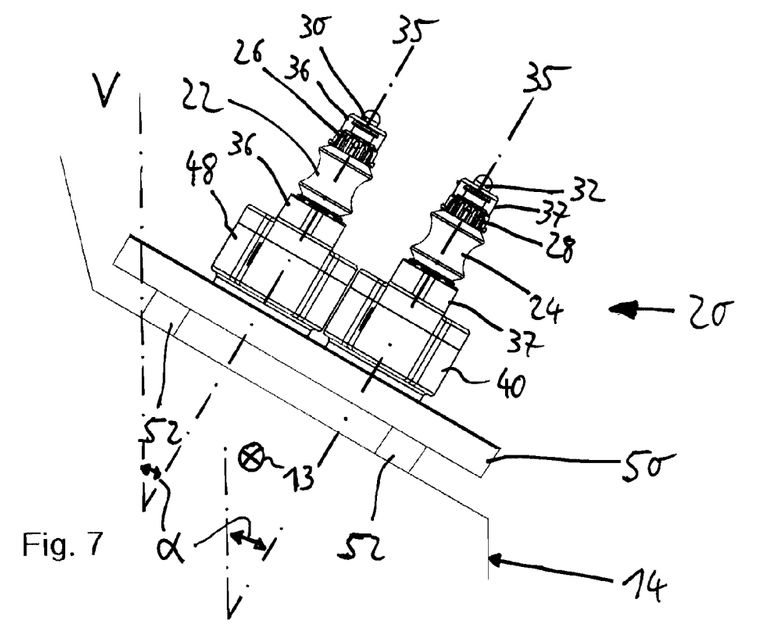
FIG. 7 is a side view of a first alternative embodiment of an inclined conveyor device.

In the alternative embodiment shown in FIG. 7, a carrier device 50 in the form of a plate is connected between the conveyor device 20 and the frame assembly 14, wherein the carrier device 50 is inclined with respect to a vertical V in the direction towards the side and thus towards an operator 15. The carrier device 50 can be secured to the frame assembly 14 by means of mounting blocks 52.

Figure 8:
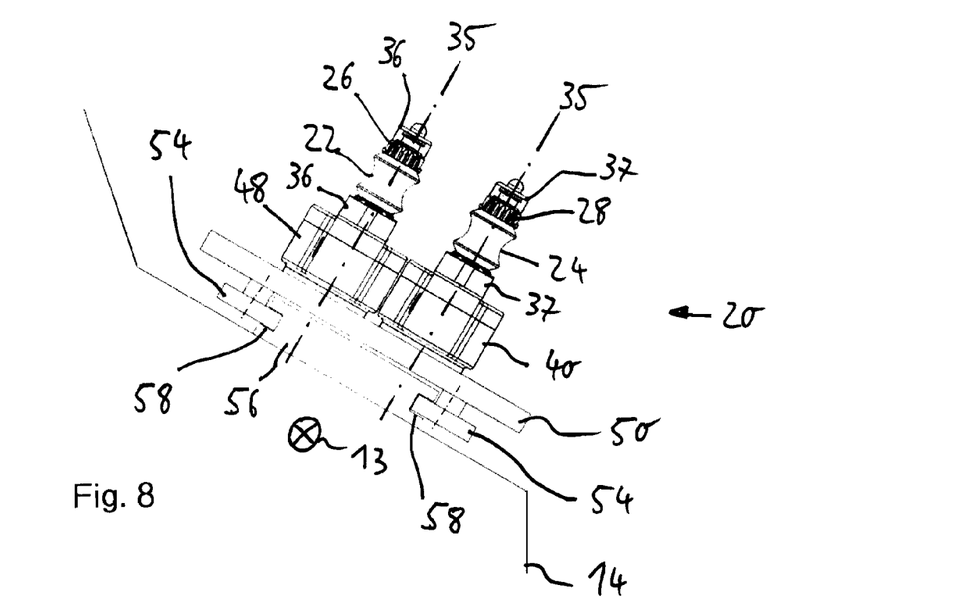
FIG. 8 is a side view of a second alternative embodiment of an inclined conveyor device.

FIG. 8 shows an alternative embodiment in which the conveyor device 20 is displaceable axially in the direction of the conveyor direction 13. For that purpose, the carrier device 50 in the form of a plate is connected to at least four rotatably supported rollers 54 which in turn are displaceable along a mounting box 56 secured to the frame assembly 14. The wheels 54 can roll within grooves 58 in the mounting block 56. Linear guides or bar guides are alternatively conceivable.

Figure 9:
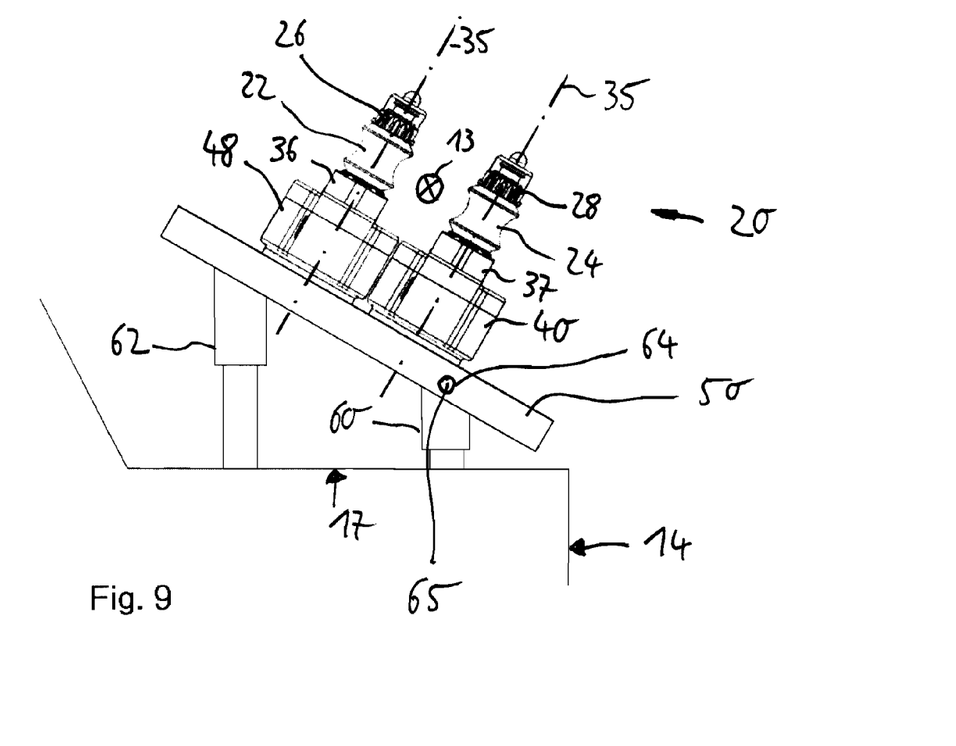
FIG. 9 is a side view of a third alternative embodiment of a conveyor device.

In the alternative embodiment shown in FIG. 9, the conveyor device 20 is also mounted on a carrier device 50 in plate form, which is arranged laterally inclinedly. The carrier device 50 can be adjusted to different angles of inclination by means of a plurality of, for example four, telescopic tubes 60, 62, and can be fixed in position. The tubes 60, 62 are in turn supported on a horizontal plate 17 of the frame assembly 14.

The tubes 60, 62 can be for example clamped fast relative to each other at different lengths or can be fixed stepwise by means of pins which can be fitted through bores. The connection between the upper ends of the tubes 60, 62 and the plate-shaped carrier device 50 can be made by means of ball joints or other mounting means.

In a modification of the FIG. 9 embodiment, in a manner not shown here, a hinge-like rotary joint can be provided in the region of the upper ends of the tubes 60, 62, indicated in FIG. 9 by reference 64, by means of which the carrier device 50 is pivotable about a pivot axis 65 so that the conveyor device 20 and therewith the conveyor elements 22, 24 can be arranged at different angles of inclination. An angle of inclination once set can then be retained by means of the telescopic tube 62 which is displaceable to and can be fixed at different lengths.

Figure 10:
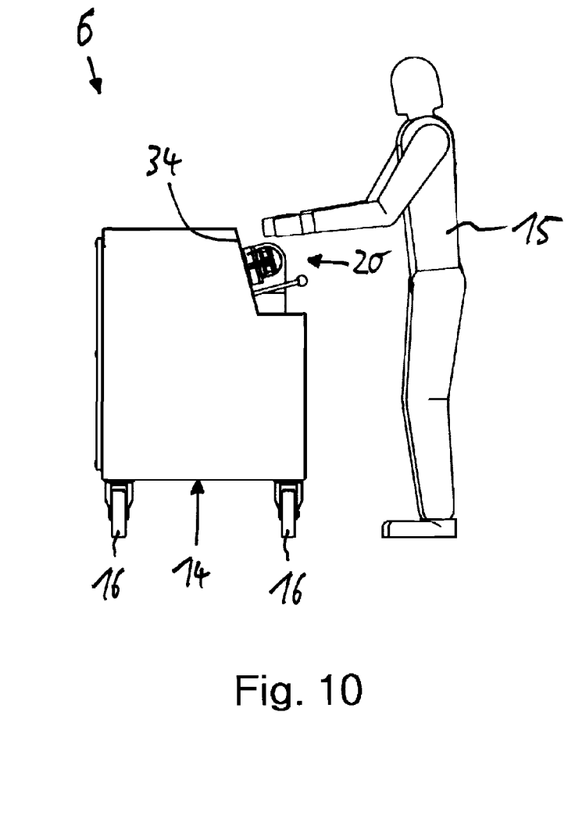
FIG. 10 is a side view of a fourth alternative embodiment of a conveyor device.
Figure 11:
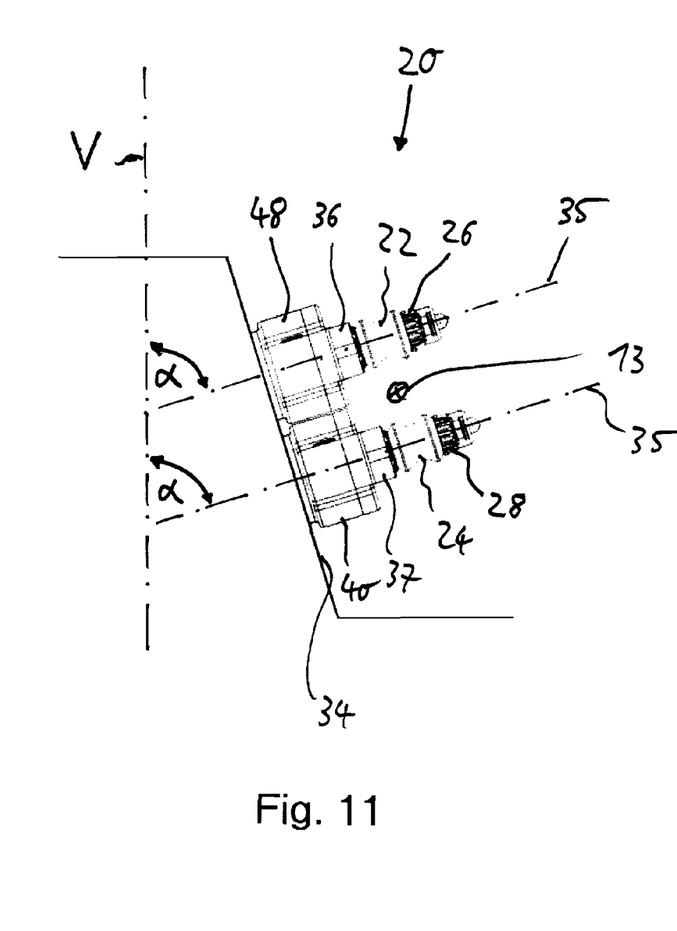
FIG. 11 is an enlarged view of a portion of the conveyor device of FIG. 10.

FIGS. 10 and 11 show an alternative embodiment of a conveyor device 20. This embodiment is in principle of a design configuration like the embodiment described hereinbefore with reference to FIGS. 1 through 6. In regard to the structure and mode of operation involved, reference is therefore directed in its full extent to the previous description, with identical or substantially identical parts being denoted by the same references. The embodiment shown in FIGS. 10 and 11 differs from the above-described embodiment essentially in that the angle of inclination α with respect to a vertical V is altered and more specifically is about 75°. That angle of inclination α is therefore also in the preferred range of angles of between 10° and 80°. This inclined arrangement also gives an operator a favorable perspective onto the conveyor elements 22, 24, as well as the sausages being conveyed.

The mode of operation of the apparatuses 1 and 6 according to the invention is as follows:

Sausage meat is conveyed out of the filling hopper 8 by means of the conveyor pump through the filling tube 10 in the conveyor direction 13 and thus introduced from the open end of the filling tube in the transitional region 12 into a sausage skin. The sausages, which are made into portions by being twisted off at a twist-off location in the transitional region 12, are further conveyed in the conveyor direction 13 by the first pair of conveyor elements 22, 24 of the conveyor device 20 of the transport apparatus 6. The sausages are transferred to the second—left-hand—pair of belts with two further conveyor elements 22, 24 and are then discharged from the transport apparatus 6 for further processing, for example to packaging machines, smoking installations, separating apparatuses or the like. By virtue of the inclined arrangement of the conveyor device 20 and the conveyor elements 22, 24, an operator 15 can well observe the sausages during the process as he can look almost from a perspective in a direction of the axes 35 perpendicularly onto the conveyor device 20.

In the case of variable angles of inclination in accordance with the embodiments corresponding to FIG. 9 the angle of inclination of a machine can be variably set. In other cases, the angle of inclination is predetermined by the respective fixed arrangement of the conveyor device 20 in an inclined position.

The invention claimed is:

1. A portioning and/or transport apparatus for portioning and/or transporting sausages, the apparatus comprising:
   a conveyor device having a drive motor, a plurality of wheels and/or rollers, and a plurality of belt conveyors or chain conveyors that are mounted on the wheels and/or rollers and that are drivable by the drive motor to circulate, the belt conveyors or chain conveyors configured to be brought into contact with each sausage for conveying the sausages with the sausages arranged between the belts during portioning and/or transporting, and the wheels and/or rollers are rotatable about inclined axes so that the belt conveyors or chain conveyors are inclined relative to a vertical (V) to the side with respect to a conveyor direction of the sausages.

2. The apparatus of claim 1 wherein the belt conveyors or chain conveyors are inclined at an angle ($\alpha$) of between about 10° and 80°.

3. The apparatus of claim 1 wherein the conveyor device is arranged inclined on a frame.

4. The apparatus of claim 1 wherein the conveyor device is arranged at a carrier device, and the entire carrier device is arranged inclined with respect to the vertical (V).

5. The apparatus of claim 4 wherein the carrier device and the belt conveyors or chain conveyors are adjustable to different angles of inclination and can be fixed in different angles of inclination.

6. The apparatus of claim 5 wherein the carrier device is pivotable about a substantially horizontal pivot axis.

7. The apparatus of claim 5 wherein the carrier device includes telescopic tubes.

8. The apparatus of claim 1 wherein the conveyor device is mounted to a frame displaceable on rollers.

9. The apparatus of claim 1 wherein the conveyor device is further mounted axially displaceably in the conveyor direction of the sausages or in opposite relationship to the conveyor direction of the sausages and the conveyor device is configured to be fixably positioned.

10. The apparatus of claim 1 wherein the at least one belt conveyors or chain conveyors are inclined at an angle ($\alpha$) of between about 30° and 75°.

11. An apparatus for producing and processing sausages, comprising
a filling machine for introducing sausage material into a case;
a twisting-off device for producing twist-off locations to produce portioned sausages; and
a portioning and/or transport apparatus for portioning and/or transporting the sausages, the portioning and/or transport apparatus comprising:
a conveyor device having a drive motor, a plurality of wheels and/or rollers, and a plurality of belt conveyors or chain conveyors that are mounted on the wheels and/or rollers and that are drivable by the drive motor to circulate, the belt conveyors or chain conveyors configured to be brought into contact with each sausage for conveying the sausages with the sausages arranged between the belts during portioning and/or transporting, and the wheels and/or rollers are rotatable about inclined axes so that the belt conveyors or chain conveyors are inclined relative to a vertical (V) to the side with respect to a conveyor direction of the sausages.

12. The apparatus of claim 11 wherein the belt conveyors or chain conveyors are inclined at an angle ($\alpha$) of between about 10° and 80°.

13. The apparatus of claim 11 wherein the conveyor device is arranged inclined on a frame.

14. The apparatus of claim 11 wherein the conveyor device is arranged at a carrier device, and the entire carrier device is arranged inclined with respect to the vertical (V).

15. The apparatus of claim 14 wherein the carrier device and the convoy belt conveyors or chain conveyors are adjustable to different angles of inclination and can be fixed in different angles of inclination.

16. The apparatus of claim 15 wherein the carrier device is pivotable about a substantially horizontal pivot axis.

17. The apparatus of claim 15 wherein the carrier device includes telescopic tubes.

18. The apparatus of claim 11 wherein the conveyor device is mounted to a frame displaceable on rollers.

19. The apparatus of claim 11 wherein the conveyor device is further mounted axially displaceably in the conveyor direction of the sausages or in opposite relationship to the conveyor direction of the sausages, and the conveyor device is configured to be fixably positioned.

20. The apparatus of claim 11 wherein the belt conveyors or chain conveyors are inclined at an angle ($\alpha$) of between about 30° and 75°.

* * * * *

UNITED STATES PATENT AND TRADEMARK OFFICE
CERTIFICATE OF CORRECTION

PATENT NO. : 8,827,774 B2
APPLICATION NO. : 12/914324
DATED : September 9, 2014
INVENTOR(S) : Jörg Bilowski Page 1 of 1

It is certified that error appears in the above-identified patent and that said Letters Patent is hereby corrected as shown below:

In the Claims

At column 7, claim number 10, line number 29, after "the" delete "at least one"

At column 8, claim number 15, line number 22, after "the" delete "convoy"

Signed and Sealed this
Twenty-fourth Day of February, 2015

Michelle K. Lee
*Deputy Director of the United States Patent and Trademark Office*